United States Patent

Julian

[11] Patent Number: 5,575,967
[45] Date of Patent: Nov. 19, 1996

[54] METHOD OF FORMING A TAMPER INDICATING CLOSURE

[75] Inventor: Randall K. Julian, Evansville, Ind.

[73] Assignee: Sunbeam Plastics Corporation, Evansville, Ind.

[21] Appl. No.: 390,686

[22] Filed: Feb. 17, 1995

[51] Int. Cl.⁶ .................................... B29C 59/02
[52] U.S. Cl. .................. 264/296; 264/320; 264/322
[58] Field of Search ............................ 264/296, 320, 264/322; 215/252

[56] References Cited

U.S. PATENT DOCUMENTS

| | | | |
|---|---|---|---|
| 3,673,761 | 7/1972 | Leitz | 53/42 |
| 3,900,550 | 8/1975 | Oliver et al. | 264/320 |
| 3,929,246 | 12/1975 | Leitz | 215/252 |
| 4,322,009 | 3/1982 | Mumford | 215/253 |
| 4,343,408 | 8/1982 | Csaszar | 215/258 |
| 4,418,828 | 12/1983 | Wilde et al. | 215/252 |
| 4,458,821 | 7/1984 | Ostrowsky | 215/252 |
| 4,479,586 | 10/1984 | Csaszar | 215/258 |
| 4,511,054 | 4/1985 | Shank | 215/252 |
| 4,545,496 | 10/1985 | Wilde et al. | 215/252 |
| 4,572,387 | 2/1986 | Luker et al. | 215/252 |
| 5,040,692 | 8/1991 | Julian | 215/252 |
| 5,056,675 | 10/1991 | Julian | 215/252 |

*Primary Examiner*—Jan H. Silbaugh
*Assistant Examiner*—Vi Duong Dang
*Attorney, Agent, or Firm*—Gifford, Krass, Groh, Sprinkle, Patmore, Anderson & Citkowski, P.C.

[57] ABSTRACT

A tamper indicating closure is formed with connecting frangible straps between the cap and the tamper indicating band by molding connecting straps which are oversized and reforming the straps to produce reduced thickness frangible straps.

4 Claims, 1 Drawing Sheet

METHOD OF FORMING A TAMPER INDICATING CLOSURE

BACKGROUND OF THE INVENTION

1. Field of the Invention

This invention relates to tamper indicating closures, and, more particularly, this invention relates to a method of forming plastic closures having a tamper indicating band depending from a cap skirt.

2. State of the Art

There is a wide variety of tamper indicating closures that are used in conjunction with containers to enable the purchaser of the product to determine whether the container has been opened. One of the most popular types of closures includes an internally threaded cap having a tamper indicating band attached to the lower end of the cap skirt by a frangible connection. The band has an inwardly projecting stop which cooperates with an outwardly projecting stop on the container neck to resist relative movement between the band and the container neck causing fracture of the frangible connection when the closure is initially unthreaded from the container neck. The band stop can be in the form of a continuous or segmented inwardly projecting bead which cooperates with an outwardly extending flange on the container neck. Alternatively, the band stop can be in the form of circumferentially spaced, inwardly projecting ratchet teeth which cooperate with circumferentially spaced, outwardly projecting ratchet teeth on the container neck. The frangible connection between the bottom of the cap skirt and the tamper indicating band preferably takes the form of circumferentially spaced, axially extending frangible or breakable webs. The width and thickness of the breakable webs are carefully selected to assure fracture when normal unthreading torque is applied to the cap but to withstand damage when the cap is initially applied to the container neck.

Normally, the closure is molded with the frangible straps spaced apart by open window areas between the bottom of the cap and the top of the tamper indicating band. U.S. Pat. Nos. 4,572,387, 4,343,408, 4,479,586 and 3,929,246 are examples of closures formed by this molding process. It is difficult to injection mold the straps with a small enough cross section to break properly during removal of the cap. Even where the dimensions of the cross section are precisely controlled, the molecular structure of the plastic is affected by the restricted flow from the cap skirt through the straps to the tamper indicating band, and this change in structure can be evidenced by non-uniform breaking characteristics immediately after molding or after an aging period in the unused closure state or after normal application to a filled container.

In some cases the cap and tamper indicating band are molded as an axially continuous annular wall with no gap delineating the cap skirt from the band. The gap is created later by cutting or slitting in such a way so as to leave the frangible straps.

One approach to the slitting process utilizes a notched cutter which cuts through a uniform closure skirt wall creating the straps and separating windows between the cap and tamper indicating band. This process is illustrated in U.S. Pat. Nos. 4,322,009 and 3,673,761. Obviously, cutter sharpening and cutter life are significant factors when this slitting process is used.

Another approach to the slitting process is cutting to a uniform depth through a non-uniform or ribbed wall thickness leaving internal ribs intact which act as the frangible straps. This process is illustrated in U.S. Pat. Nos. 4,418,828, 4,545,496 and 4,511,054. This also requires frequent cutter sharpening and replacement.

SUMMARY OF THE INVENTION

The method of forming a tamper indicating closure of the present invention overcomes the problems associated with the prior art devices which form the separation between the cap skirt and the tamper indicating band and the connecting frangible straps either solely by injection molding or by a combination of molding and slitting. In the new method of the invention, the closure is molded with an axial gap between the cap skirt and the tamper indicating band with the connecting straps separated by open window areas as in prior art closures made only by injection molding. However, the closure is molded with much thicker straps to provide a free flow of molten plastic from the cap to the band which maintains a uniform molecular structure. The straps are too thick to be frangible in this "as molded" condition. In a separate step, the straps are reformed, reducing them to a proper thickness to become frangible straps which will break during cap removal.

BRIEF DESCRIPTION OF THE DRAWING

The advantages of the present invention will be more apparent from the following detailed description when considered in connection with the accompanying drawing wherein.

DESCRIPTION OF THE PREFERRED EMBODIMENT

Figure 1:
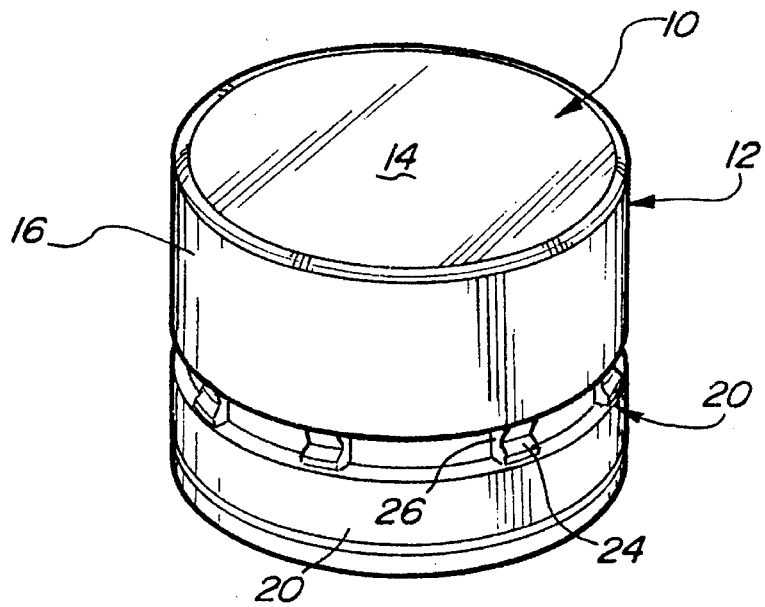
FIG. 1 is a perspective view of the finished tamper indicating closure formed by the method of this invention.

A finished tamper indicating closure 10 molded by the method of this invention is shown in FIG. 1 as including a cap 12 with a top 14 and an internally threaded annular wall 16 depending from the periphery of the top. An annular tamper indicating band 18 is attached to the lower end of the annular cap wall 16 at circumferentially spaced, axially extending straps 20.

The tamper indicating band is molded with an inwardly directed stop in the form of a continuous bead 22 which cooperates with an outwardly extending flange on a container neck to resist relative movement between the band and the container neck so that when the closure is initially unthreaded, the straps 20 must break to remove the closure. The stop on the tamper indicating band could also take the form of circumferentially spaced ratchet teeth which will cooperate with ratchet teeth on the container neck to resist relative motion.

In prior art closures completely formed by injection molding, the connecting straps are molded as frangible straps which break during unthreading. Typically with a 1" to 2" diameter cap, the straps would be approximately 1/16"

wide with a thickness of 0.010", and 4 to 6 circumferentially spaced straps would be used.

Figure 3:
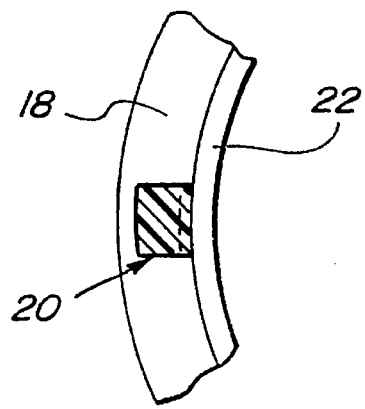
FIG. 3 is a partial cross-sectional view along line 3—3 of FIG. 2.
Figure 2:
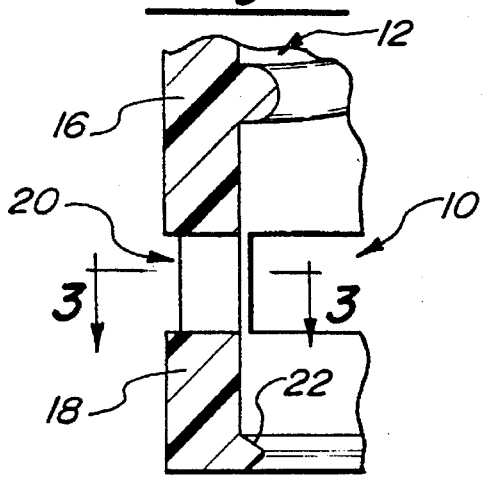
FIG. 2 is a partial elevational view through a portion of the cap side wall and tamper indicating band with the inner connecting straps in the as molded condition.
Figure 4:
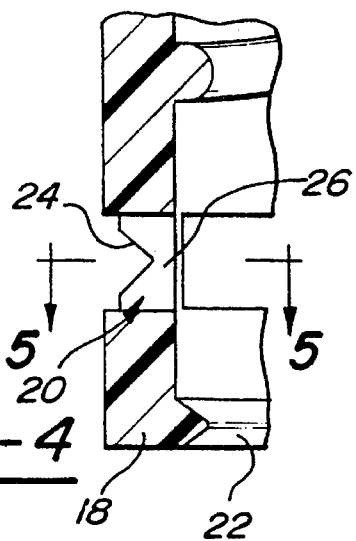
FIG. 4 is a view similar to FIG. 3 showing a strap as it has been thinned in a step subsequent to the molding step.
Figure 5:
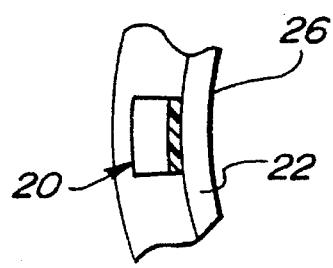
FIG. 5 is a partial sectional view along line 5—5 of FIG. 4.

Under the method of the invention, the straps 20 are molded too thick to break under unthreading torque. Preferably a thickness of 1 mm or approximately 0.04" will be used with FIGS. 2 and 3 showing the as molded condition of the connecting straps 20. The straps 20 are then reformed, reshaping each strap as seen at 24, preferably extending from the outside surface toward the inside surface leaving a frangible strap portion 26 having a reduced thickness of approximately 0.01" as best seen in FIGS. 4 and 5. Increasing the strap thickness allows free flow in the closure part during liquid phase molding by, for example, conventional compression or injection molding. Subsequent reforming allows the straps to be reshaped in a solid phase pressure forming or cold working step to produce a reduced thickness frangible strap portion. Preferably this is accomplished by an external tool or die pushing the strap against an internal anvil or mandrel surface. It will be appreciated that reforming can be accomplished from the smaller inside diameter outwardly, and, although less desirable, reforming can be accomplished by a machining operation, removing material rather than reshaping.

The process of molding the connecting straps well oversized for a good molecular structure producing straps too strong to break and then reshaping the straps to reduce thickness to frangible straps produces frangible connections which will reliably fracture at normal unthreading torque.

I claim:

1. A method of producing a tamper indicating closure comprising the following steps:

molding a cap with an internally threaded generally annular wall and an annular tamper indicating band depending from said annular cap wall, the band being connected to the cap by a plurality of circumferentially spaced, axially extending straps separated by open window areas between the cap wall and the band, said straps being thick enough to provide a free flow of molten plastic from the cap to the band during the molding step, thereby maintaining a uniform molecular structure in said straps, and said straps being too thick to break under unthreading torque;

reforming said straps to reduce their thickness making them frangible upon initial unthreading rotation of the cap; and wherein said annular tamper indicating band is molded with inwardly projecting stop means which cooperates with outwardly extending stop means on a container neck to resist relative movement between the band and the container neck so that as the closure is unthreaded the frangible straps will break leaving the tamper indicating band on the container neck.

2. The method according to claim 1 wherein the inner surface of the cap wall, the tamper indicating band and the straps are molded all in line with each other.

3. The method according to claim 2 wherein said straps are molded to extend radially outward from the inner surfaces of said cap wall and said tamper indicating band toward an outer surface of said cap wall, and wherein said reforming step is conducted by cold working with a reshaping die using an internal anvil.

4. The method according to claim 1 wherein said annular tamper indicating band is molded with an inwardly projecting bead which is retained under an outwardly projecting flange on the container neck.

\* \* \* \* \*